United States Patent
Bushey et al.

(10) Patent No.: US 11,492,079 B2
(45) Date of Patent: Nov. 8, 2022

(54) COVERING AND METHOD OF FORMING A COVERING FOR A HATCH DOOR

(71) Applicants: Richard D. Bushey, Kenosha, WI (US); Bret L. Bushey, Mt. Pleasant, WI (US); Jeremy B. Zapfe, Burlington, WI (US)

(72) Inventors: Richard D. Bushey, Kenosha, WI (US); Bret L. Bushey, Mt. Pleasant, WI (US); Jeremy B. Zapfe, Burlington, WI (US)

(*) Notice: Subject to any disclaimer, the term of this patent is extended or adjusted under 35 U.S.C. 154(b) by 353 days.

(21) Appl. No.: 16/700,258

(22) Filed: Dec. 2, 2019

(65) Prior Publication Data
US 2020/0172201 A1 Jun. 4, 2020

Related U.S. Application Data

(60) Provisional application No. 62/773,603, filed on Nov. 30, 2018.

(51) Int. Cl.
| | |
|---|---|
| *B63B 19/14* | (2006.01) |
| *B29C 33/00* | (2006.01) |
| *E06B 3/30* | (2006.01) |
| *B63B 3/54* | (2006.01) |
| *B29C 39/38* | (2006.01) |

(52) U.S. Cl.
CPC .............. *B63B 19/14* (2013.01); *B29C 33/00* (2013.01); *B29C 39/38* (2013.01); *B63B 3/54* (2013.01); *E06B 3/30* (2013.01)

(58) Field of Classification Search
CPC .......... B63B 19/14; B63B 19/28; B63B 3/48; B63B 2003/485; B63B 5/06; B63B 33/00; B29C 39/38
See application file for complete search history.

(56) References Cited

U.S. PATENT DOCUMENTS

| | | | |
|---|---|---|---|
| 5,076,188 A * | 12/1991 | Burroughs .............. | B63B 19/14 114/201 R |
| 2009/0236030 A1* | 9/2009 | Marc .................... | B29D 35/062 156/145 |
| 2013/0233228 A1* | 9/2013 | Bartlett .................. | D04H 11/00 114/85 |
| 2019/0118912 A1* | 4/2019 | Verdadeiro Marques ................... | B63B 32/77 |

* cited by examiner

*Primary Examiner* — Andrew Polay
(74) *Attorney, Agent, or Firm* — Boyle Fredrickson, S.C.

(57) ABSTRACT

A covering and a method of forming a covering for a hatch door or lid, e.g., the hatch door of a marine vehicle, such a boat or the like, is provided. The covering includes a central portion having a configuration corresponding to a configuration of the hatch door and a thickness. A flange projects from the central portion and has a thickness less than the thickness of the central portion. The flange movable between a first position wherein the flange lies in a first plane generally parallel to a first surface of the central portion and a second position wherein the flange is generally perpendicular to the first plane and defines a cavity in the covering for receiving the hatch door therein.

23 Claims, 11 Drawing Sheets

COVERING AND METHOD OF FORMING A COVERING FOR A HATCH DOOR

CROSS-REFERENCE TO RELATED APPLICATION

This application claims priority from U.S. Provisional Patent Application Ser. No. 62/773,603 filed on Nov. 30, 2018, the entirety of which is expressly incorporated by reference herein.

FIELD OF THE INVENTION

This invention relates generally to floor coverings, and in particular, to a covering and a method of forming a covering for a hatch door or lid, e.g., the hatch door of a marine vehicle, such a boat or the like.

BACKGROUND AND SUMMARY OF THE INVENTION

The decks of marine vehicles, such as boats, are often constructed from sheets fabricated from various types of material. For example, these sheets may be fabricated from marine plywood, composite materials or High Density Polyethylene (HDPE). For aesthetic reasons and for the comfort of those walking thereon, the decks of marine vehicles are often covered with some sort of floor covering. These floor coverings are often fabricated from a soft material which does not retain heat. For example, the decks of marine vehicles may be covered with a marine carpet, vinyl or other soft material such as rubber.

Heretofore, marine carpet has been the most common covering for the decks of marine vehicles due to its inexpensive cost and the ease with which the marine carpet may be installed. As is known, marine carpet conforms to uneven surfaces and may be wrapped around the hatch doors and many varieties of lids provided in the deck of the marine vehicle. However, there are a number of disadvantages associated with the use of marine carpet on the decks of marine vehicles. By way of example, marine carpet has a tendency to absorb water. As a result, the marine carpet tends to support mold growth. In addition, marine carpet can be difficult to clean, may become damaged by various items on the marine vehicle (e.g., fishing tackle or the like) and can show significant wear after only limited use. Hence, an alternative to marine carpet as a floor covering on the decks of marine vehicles is highly desirable.

In order to overcome the difficulties and limitations associated with the use of marine carpet as a floor covering on the decks of marine vehicles, it has been proposed to construct marine floor coverings out of sheets of polymer foam, such as ethylene-vinyl acetate (EVA). Polymer foams are easy to clean, do not support mold growth, are cool to the touch in fractions of a second in direct sun heat and can be made available in varieties of colors, densities and textures. However, sheets of polymer foam cannot, typically, be wrapped around the hatch doors and the many varieties of lids provided in the decks of the marine vehicles because of the thickness and stiffness of the foams, thereby rendering polymer foam sheets unsuitable as a marine floor covering.

As such, there is a significant need to provide a method of constructing a marine floor covering fabricated out of a polymer foam which may be used to wrap around the hatch doors and the many varieties of lids provided in the decks of the marine vehicles.

Therefore, it is primary object and feature of the present invention to provide a covering and a method of forming a covering for a hatch door of a marine vehicle, such a boat or the like.

It is a further object and feature of the present invention to provide a covering for a hatch door of a marine vehicle that is easy to clean, does not support mold growth, is cool to the touch in direct sun heat and can be made available in varieties of colors, densities and textures.

It is a still further object and feature of the present invention to provide a covering for a hatch door of a marine vehicle that may be simply and easily mounted to the hatch door.

It is a still further object and feature of the present invention to provide a method of forming a covering for a hatch door that may be simply and easily fabricated from known materials.

In accordance with the present invention, a method of forming a covering for a lid is provided. The method includes the step of heating a mold having a male component and a female component. The female component includes a depression and a flange portion extending around a perimeter of the depression. At least a portion of the covering is inserted into the depression of the female component so as to form a cavity in the at least a portion of the covering inserted into the depression. The male component into the cavity and removed from the mold cavity when the covering has cooled. The covering is then removed from the female component of the mold.

The covering removed from the female component of the mold includes a central portion having a configuration corresponding to a configuration of the lid and a flange projecting from the central portion. The lid may be positioned within the cavity of the covering with at least a portion of the flange extending over a sidewall of the lid. At least a portion of the flange may be secured to at least one arcuate corner wall of the lid. Alternatively, at least a portion of the flange may be secured to the sidewall of the hatch door.

The step of inserting at least the portion of the covering into the depression of the female component may include the steps of heating the flange and moving the flange relative to the central portion. It is contemplated to form the covering from a polymer foam and to machine a sheet to form the covering prior to inserting at least a portion of the covering into the depression of the female component.

In accordance with a further aspect of the present invention, a method of covering a hatch door is provided. The hatch door has a plate and a sidewall extending therefrom. The method includes the step of modifying a sheet of foam material to form a covering. The covering includes a central portion and a flange projecting from an outer periphery of the central portion. The flange is moved relative to the central portion of the covering so as to provide a cavity in the covering. The hatch door is positioned in the cavity of the floor covering and at least a portion of the flange is wrapped over the sidewall of the hatch door.

The flange may be heated prior to moving the flange relative to the central portion and the flange may be affixed to the sidewall of the hatch door and/or at least one arcuate corner wall of the hatch door. The flange may be moved relative to central portion of the covering by positioning the flange of the covering on a flange portion of a female mold component which extends about a depression in the female mold component. Thereafter, a male mold component may be brought into contact with the central portion of the covering so as to urge the central portion of the floor covering into the depression.

In accordance with a still further aspect of the present invention, a covering for a hatch door is provided. The covering includes a central portion having a configuration corresponding to a configuration of the hatch door and a thickness. A flange projects from the central portion and has a thickness less than the thickness of the central portion. The flange is movable between a first position wherein the flange lies in a first plane generally parallel to a first surface of the central portion and a second position wherein the flange is generally perpendicular to the first plane and defines a cavity in the floor covering for receiving the hatch door therein.

The flange may include an outer periphery and a lip may project from at least a portion of the flange adjacent the outer periphery. The lip stabilizes the flange when heated and extends around the entirety of a perimeter of the flange adjacent the outer periphery. Alternatively, the flange may include an outer flange periphery. The outer flange periphery of the flange can be rollable over a sidewall of the hatch door when the hatch door received is in the cavity. The outer flange periphery may be secured to the sidewall of the hatch door and/or to at least one arcuate corner wall of the hatch door.

As described, a covering and a method of forming a covering for a hatch door or lid, e.g., the hatch door of a marine vehicle, such a boat or the like, are disclosed. A polymer foam sheet may be machined into the covering. The covering preferably includes a central portion and a flange extending from and circumscribing the central portion.

The central portion includes a first surface and a second surface located and positioned opposite from one another and generally parallel to each other. The flange includes a first flange surface and a second flange surface. The first and second flange surface are generally parallel to each other and the second flange surface is generally coplanar to the second surface of the central portion.

The central portion of the covering is intended to selectively mate with a depression located and positioned within a female component of a mold. The female component of the mold further includes a female component flange portion that extends around a perimeter of the depression. In operation, the female component of the mold is heated. The central portion of the floor covering is then inserted into the depression of the female component so that the central portion selectively mates with the depression. As the central portion of the covering is inserted into the depression, the female component flange portion is forced upwards so that it is folded perpendicularly to form a cavity. The female component flange portion therefore forms the sidewalls of the cavity.

The male component of the mold is also heated before being inserted into the newly formed cavity. Once the floor covering has cooled, the floor covering may be removed from the mold. In order to secure the covering to a hatch door, the hatch door may be inserted into the cavity of the covering so that a plate of the hatch door is adjacent to and abuts a first surface of the central portion. The flange of the floor covering may then be wrapped over a first hatch sidewall, second hatch sidewall, first hatch end, and a second hatch end and secured to their inner surfaces.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

For the purpose of illustration, certain embodiments of the present invention are shown in the drawings. It should be understood, however, that the invention is not limited to the precise arrangements, dimensions, and instruments shown. Like numerals indicate like elements throughout the drawings. In the drawings:

FIG. 1a is a cross-sectional view of the polymer foam sheet of FIG. 1 taken along line 1a-1a;

FIG. 2a is a cross-sectional view of the polymer foam sheet of FIG. 2 taken along line 2a2a;

While the invention is described herein in connection with certain preferred embodiments, there is no intent to limit it to those embodiments. On the contrary, the intent is to cover all alternatives, modifications and equivalents within the spirit and scope of the invention as defined by the appended claims.

DETAILED DESCRIPTION OF THE INVENTION

Figure 1:
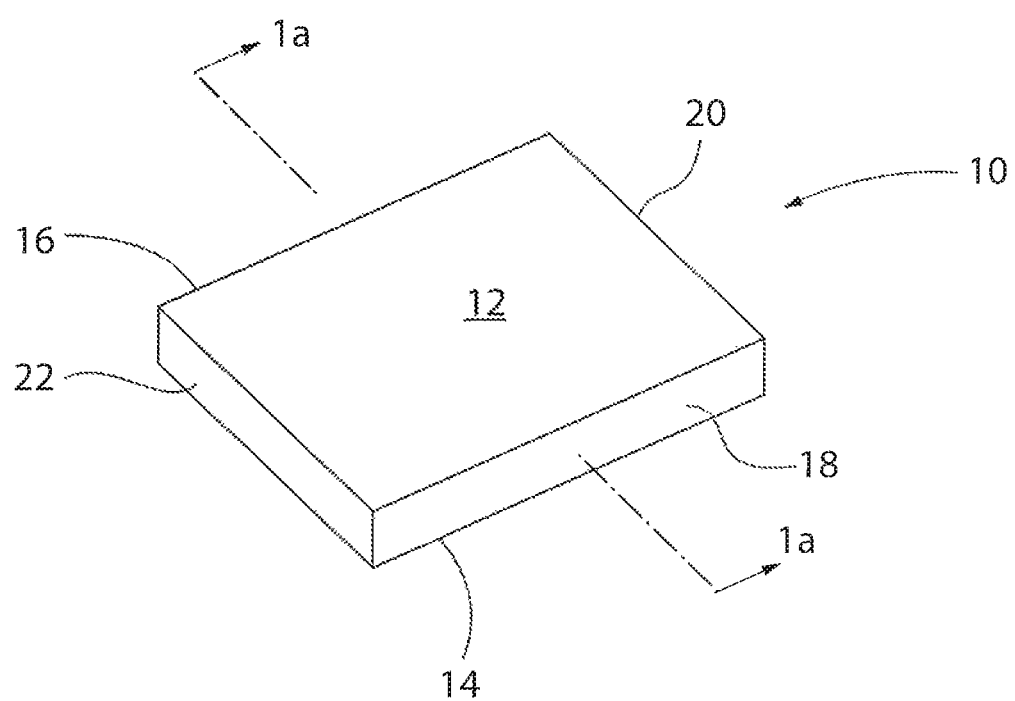
FIG. 1 is an isometric view of a polymer foam sheet.
Figure 1A:
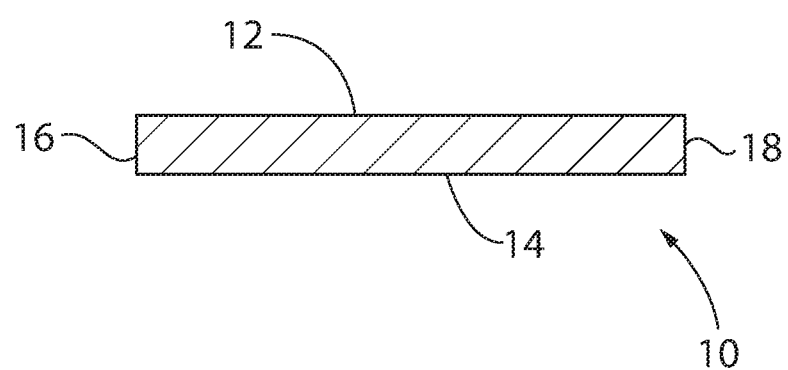

Referring to FIGS. 1 and 1a, a sheet of polymer foam utilized in the methodology of the present invention is generally designated by the reference number 10. Sheet 10 has a generally rectangular configuration and is defined by first surface 12 and second surface 14. First surface 12 and second surface 14 are preferably generally parallel faces or surfaces, located and positioned opposite from each other. First surface 12 and second surface 14 are further spaced apart by first side 16 and second side 18, as well as, first end 20 and second end 22. First side 16 and second side 1S are preferably generally parallel to each other. Similarly, first end 20 and second end 22 are also generally parallel to each other. Both first end 20 and second end 22 are generally perpendicular to both first side 16 and second side 18. Thus, first side 16, second side 18, first end 20, and second end 22 extend between first surface 12 and second surface 14.

Figure 2:
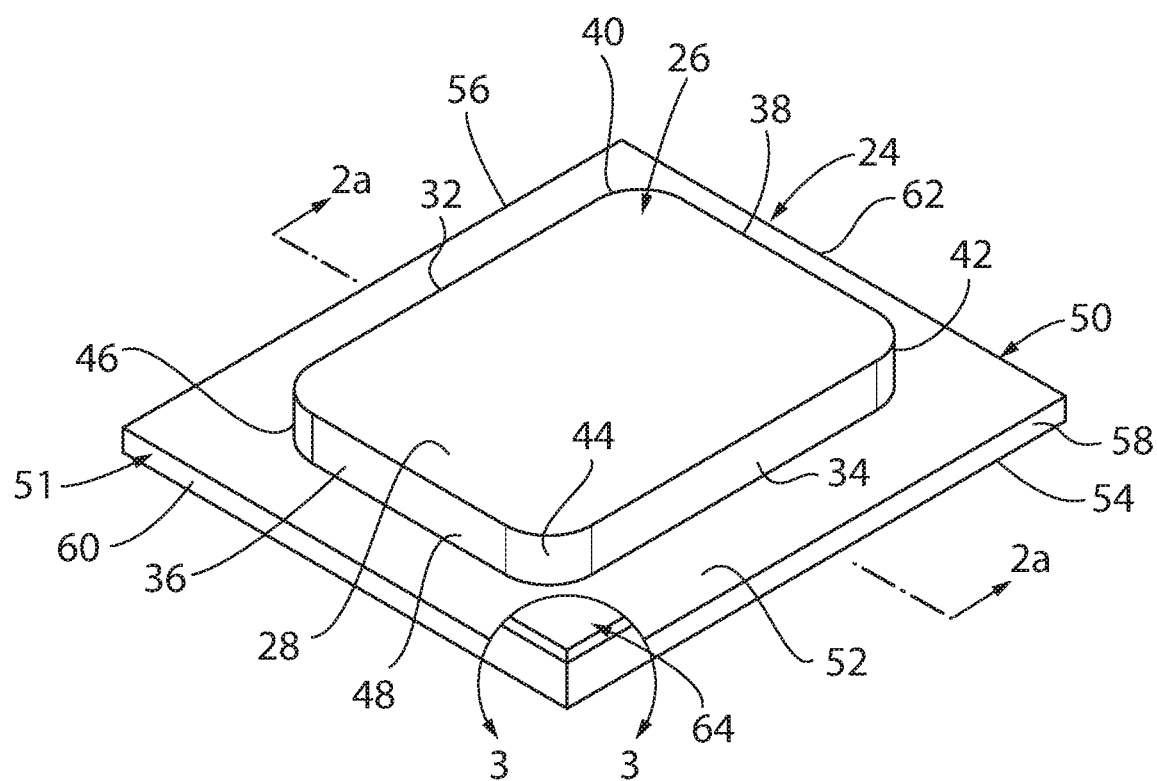
FIG. 2 is an isometric view of the polymer foam sheet of FIG. 1 after an initial step in the fabrication of a covering in accordance with a methodology in accordance with the present invention.
Figure 2A:
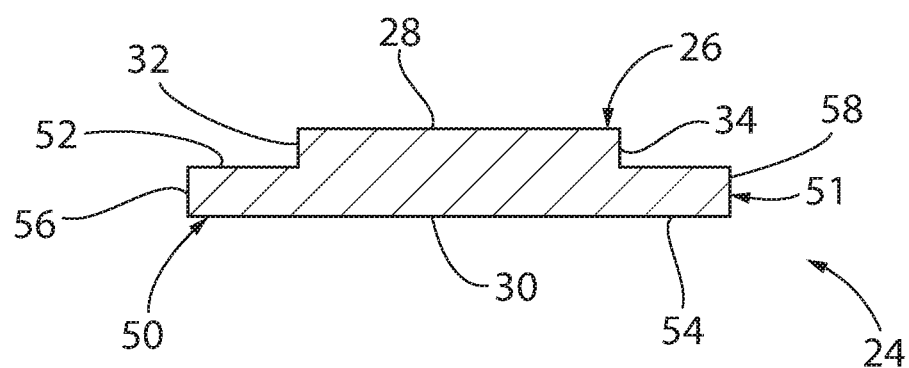

Referring to FIGS. 2 and 2a, in operation, the sheet 10 may be machined in any conventional manner to provide covering 24, as hereinafter described. Alternatively, it can be appreciated that covering 24, as hereinafter described, may be formed in any conventional manner, e.g., by molding, without deviating from the scope of the present invention. Covering 24 includes central portion 26 corresponding in shape to hatch 27 (shown in FIGS. 5 and 5a) upon which the covering 24 is to be mounted. It can be appreciated that the size and shape of hatch 27 may vary, and consequently, the size and shape of central portion 26 may be varied accordingly without deviating from the scope of the present invention. It can be further appreciated that covering 24 may be used to cover other types of lids, such as container lids, cooler lids, and the like, without deviating from the scope of the present invention.

In the depicted embodiment illustrated in FIGS. 2 and 2a, central portion 26 of covering 24 has a generally rectangular configuration. Central portion 26 is defined by first surface 28 and second surface 30. First surface 28 and second surface 30 are both substantially rectangular surfaces or faces. First surface 28 and second surface 30 are spaced apart by first side 32 and second side 34, as well as, first end 36 and second end 38. In other words, first side 32, second side 34, first end 36, and second end 38 extend between first surface 28 and second surface 30. First surface 28 and second surface 30 are generally parallel to each other, while first end 36 is generally parallel to second end 38. First side 32 of central portion 26 is interconnected to second end 38 of central portion 26 by first rounded corner 40; second end 38 of central portion 26 is interconnected to second side 34 of central portion 26 by second rounded corner 42; second side 34 of central portion 26 is interconnected to first end 36 of central portion 26 by third rounded corner 44; and first end 36 of central portion 26 is interconnected to first side 32 of central portion 26 by fourth rounded corner 46. First side 32, second side 34, first end 36, and second end 38 and rounded corners 40, 42, 44 and 46 define outer periphery 48 of central portion 26.

Flange 50 projects radially outwards or away from outer periphery 48 of central portion 26 and terminates at outer edge 51. As described, outer edge 51 extends around the perimeter of the flange 50. Flange 50 is further defined by first flange surface 52 and second flange surface 54. First flange surface 52 is located and positioned opposite from second flange surface 54. First flange surface 52 and second flange surface 54 are generally parallel to each other and are spaced apart from each other by first flange side 56 and second flange side 58, as well as, by first flange end 60 and second flange end 62. First flange side 56 and second flange side 58 are preferably generally parallel to each other, while first flange end 60 and second flange end 62 are also generally parallel to each other. Thus, outer perimeter 51 of flange 50 includes first flange side 56, second flange side 58, first flange end 60, and second flange end 62.

First surface 52 of flange 50 is further generally parallel to and spaced from first surface 28 of central portion 26. Second surface 54 of flange 50 is generally co-planer with second surface 30 of central portion 26. Central portion 26 has a first thickness, while flange 50 has a second thickness less than the first thickness.

Figure 3:
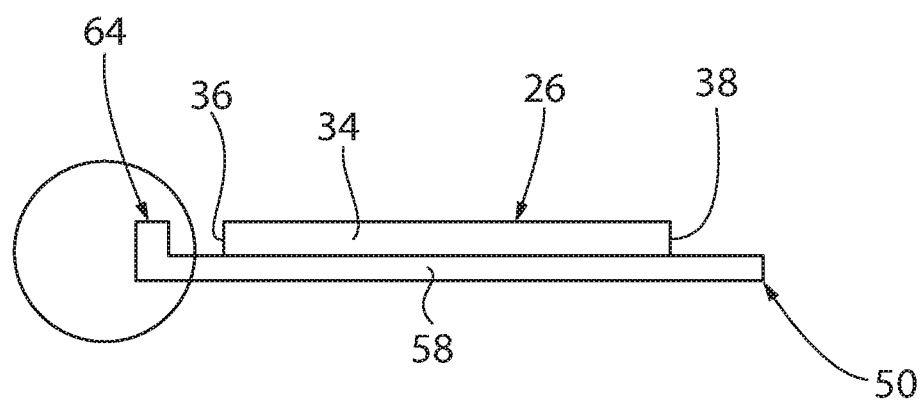
FIG. 3 is an enlarged, isometric view showing a portion of the polymer foam sheet of FIG. 2.

Flange 50 may include a stabilizing rib or lip 64, as illustrated in FIGS. 2a and 3. Lip 64 may project from first surface 52 of flange 50 along an axis generally perpendicular to first surface 52 of flange 50, as seen in FIG. 3. Lip 64 may extend around the entirety of the perimeter of the first surface 52. Alternatively, lip 64 may extend around at least a portion of the perimeter of first surface 52. It is intended for lip 64 to stabilize flange 50 when flange 50 is heated, as hereinafter described.

Figure 4:
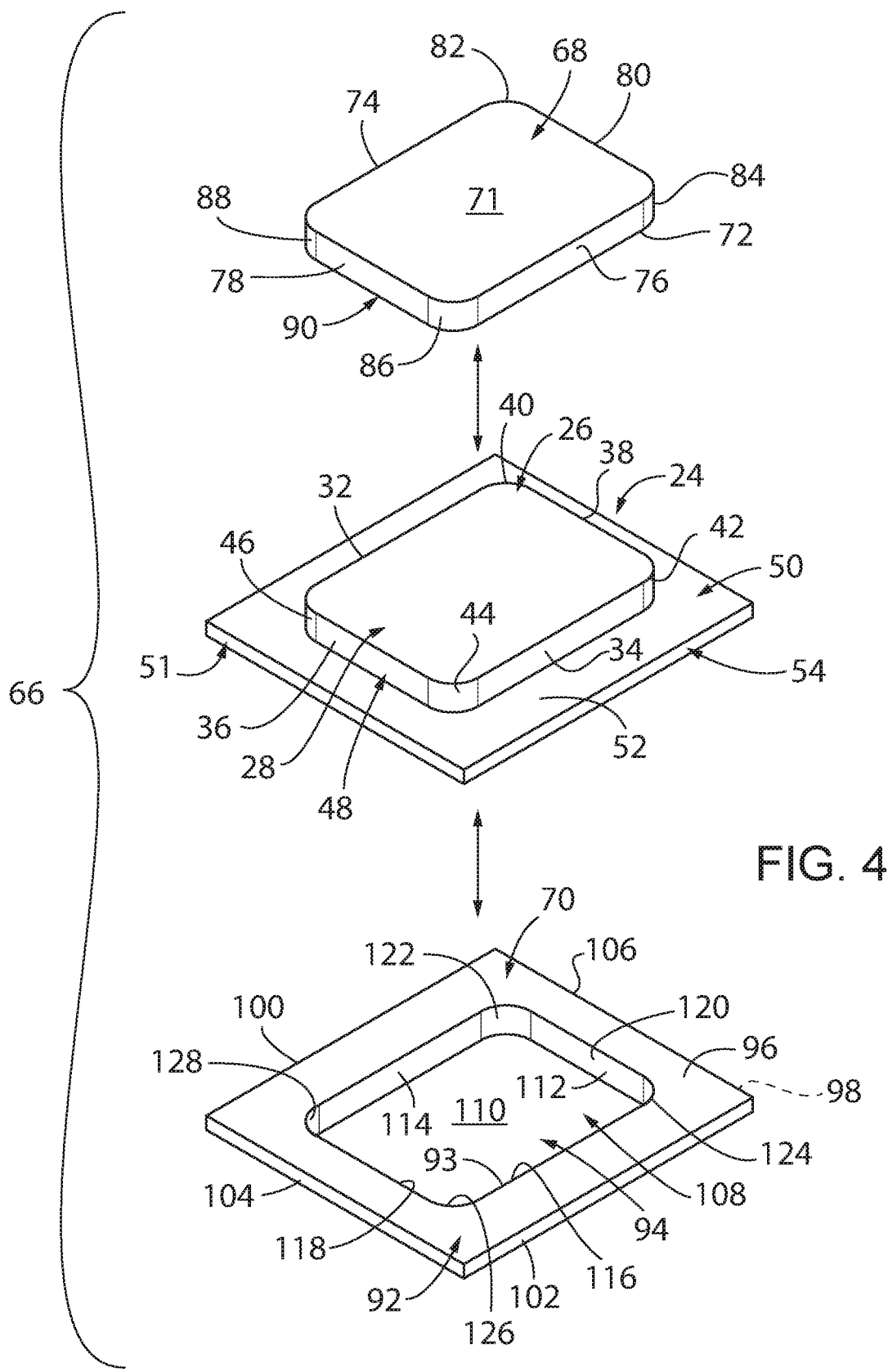
FIG. 4 is an exploded, isometric view showing a second step in the fabrication of the covering in accordance with the present invention.
Figure 4A:
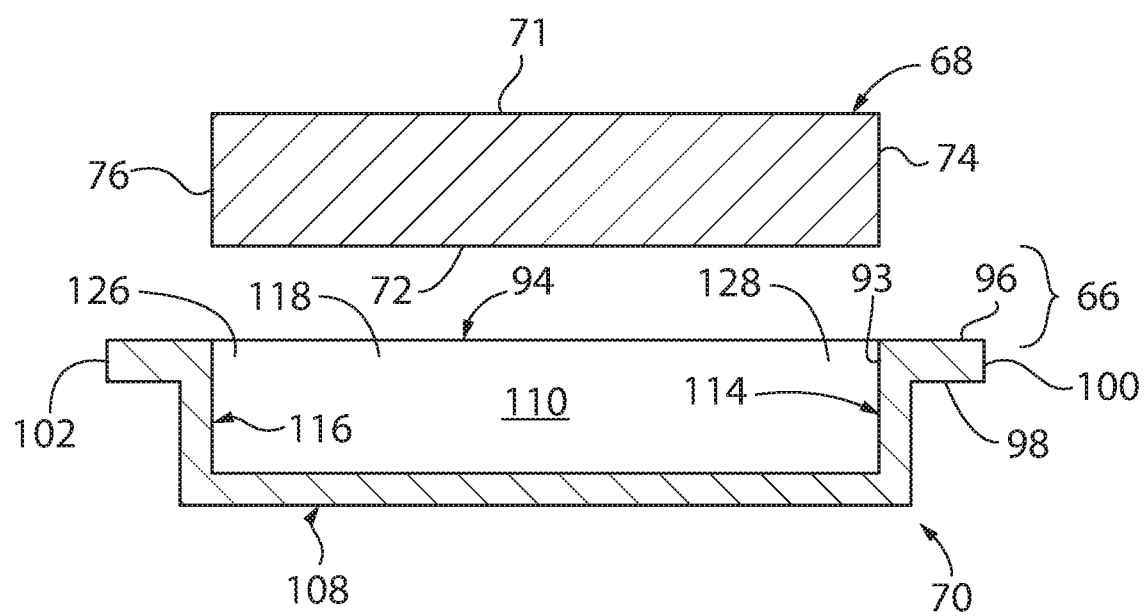
FIG. 4a is a cross-sectional view of a mold for effectuating the second step in the fabrication of the covering in accordance with the present invention.

Turning to FIGS. 4 and 4a, in order to form covering 24, mold 66 is utilized. Mold 66 includes male component 68 and female component 70. Male component 68 has a generally rectangular configuration and is defined by first male component surface 71 and second male component surface 72. First and second male component surfaces 71 and 72, respectively, are located and positioned opposite from each other and are spaced apart from each other by first male component side 74, second male component side 76, first male component end 78, and second male component end 80. First male component side 74 is generally parallel to second male component side 76. Likewise, first male component end 78 is generally parallel to second male component end 80. First male component side 74 is therefore substantially perpendicular to both first male component end 78 and second male component end 80. Similarly, second male component side 76 is also substantially perpendicular to both first male component end 78 and second male component end 80.

First male component side 74 of male component 68 is interconnected to second male component end 80 of male component 68 by first rounded male component corner 82. Second male component end 80 is interconnected to second male component side 76 by second rounded male component corner 84, while second male component side 76 of male component 68 is interconnected to first male component end 78 by third male component rounded corner 86. Finally, first male component end 78 is interconnected to first male component side 74 by fourth rounded male component corner 88. First and second male component sides 74 and 76, respectively, first and second male component ends 78 and 80, respectively, and rounded male component corners 82, 84, 86 and 88 define outer male component periphery 90 of male component 68. It is intended for outer male component periphery 90 of male component 68 to correspond in size and shape to outer periphery 48 of central portion 26 of covering 24.

Female component 70 of mold 66 includes female component flange portion 92. Female component flange portion 92 preferably corresponds in size and shape to flange 50 of covering 24, as hereinafter described. Female component flange portion 92 includes inner female component edge 93 that projects from female component flange portion 92 to define central female component opening 94 therein adapted for receiving male component 68 therein. Female component flange portion 92 includes first female component flange surface 96 and second female component flange surface 98. First female component flange surface 96 is spaced apart from second female component flange surface 98 and is preferably generally parallel to second female component flange surface 98.

Female component flange portion 92 further includes first female component flange side 100 and second female component flange side 102, which both preferably extend between first female component flange surface 96 and second female component flange surface 98. First female component flange side 100 and second female component flange side 102 are generally parallel to each other. Female component flange portion 92 also includes first female component flange end 104 and second female component flange end 106, preferably generally parallel to each other. First and second female component flange ends 104 and 106, respectively, also preferably extend between first female component flange surface 96 and second female component flange surface 98. First female component flange side 100 is therefore generally perpendicular to both first female component flange end 104 and second female component flange end 106. Likewise, second female component flange side 102 is also generally perpendicular to both first female component flange end 104 and second female component end 106.

Central female component opening 94 of the female component 70 further includes lower plate 108 extending from inner female component edge 93 to form cavity or depression 110. Depression 110 is defined by outer depression periphery 112 that is interconnected to inner edge 93 of flange portion 92. Outer depression periphery 112 is interconnected to inner female component edge 93 by first depression periphery sidewall 114, second depression periphery sidewall 116, first depression periphery end wall 118, and second depression periphery end wall 120. Inner female component edge 93 may be integrally formed with first and second depression periphery sidewalls 114 and 116, respectively, as well as, first and second depression periphery end walls 118 and 120, respectively.

First depression periphery sidewall 114 is interconnected to second depression periphery end wall 120 of depression 110 by first rounded depression periphery corner 122. Second depression periphery end wall 120 of depression 110 is interconnected to second depression periphery sidewall 116 of depression 110 by second rounded depression periphery corner 124. Second depression periphery sidewall 116 of depression 110 is interconnected to first depression periphery end wall 118 of depression 110 by third rounded depression periphery corner 126. Finally, first depression periphery end wall 118 of depression 110 is interconnected to first depression periphery sidewall 114 of depression 110 by fourth rounded depression periphery corner 128. First and second sidewalls 114 and 116, respectively, first and second end walls 118 and 120, respectively, and rounded corners 122, 124, 126 and 128 define depression 110 for receiving central portion 26 of covering 24 and male component 68 of the mold 66, as hereinafter described.

Figure 4B:
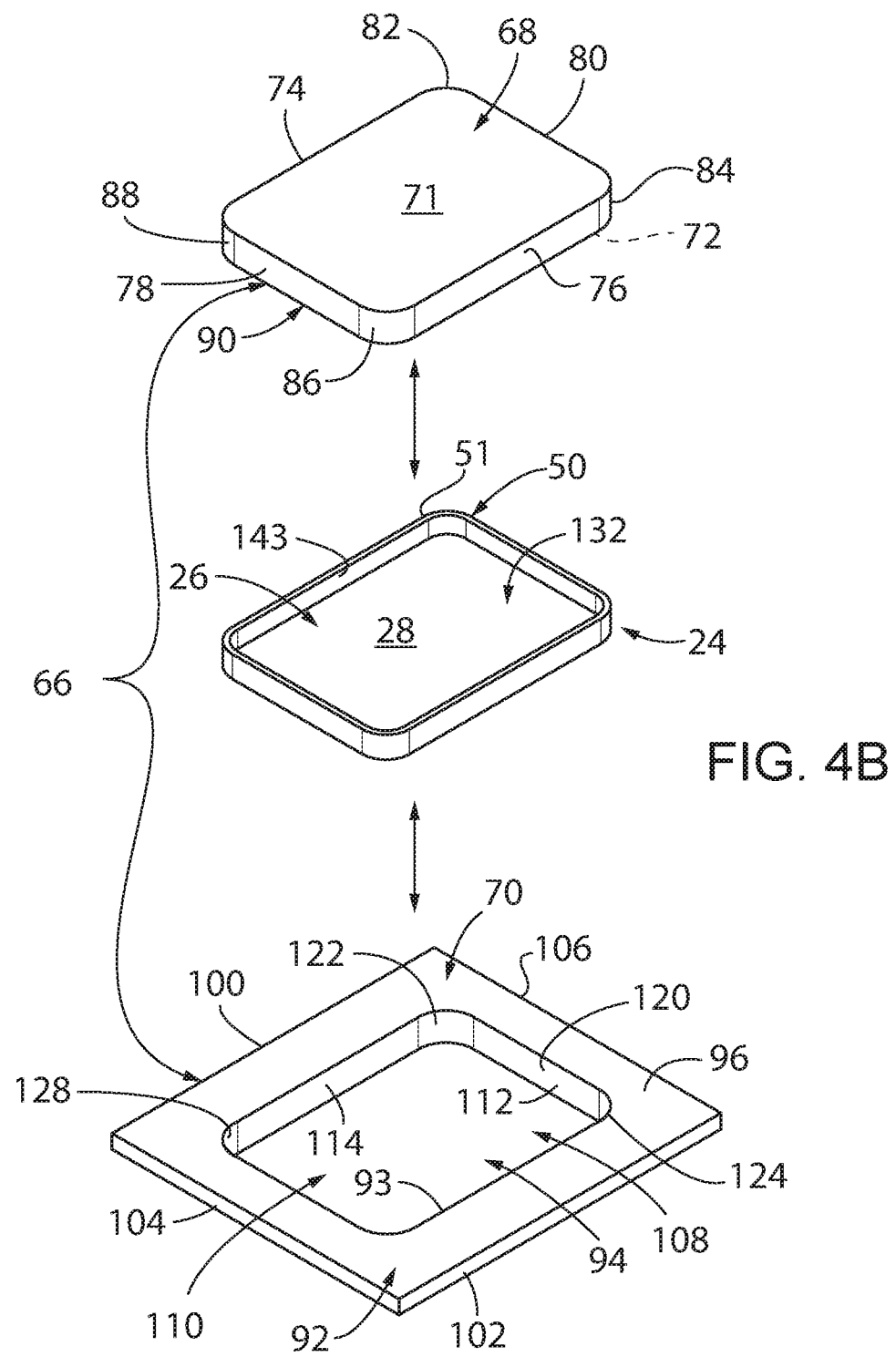
FIG. 4b is an exploded, isometric view showing a third step in the fabrication of the covering in accordance with the present invention.

Referring to FIG. 4, in order to shape covering 24, male and female components 68 and 70, respectively, of mold 66 may be heated to a predetermined level such that covering 24 becomes pliable when inserted into mold 66. Alternatively, instead of or in addition to heating mold 66, covering 24 may be preheated, for example, by utilizing a hot plate or infrared heat, such that covering 24 is pliable when inserted into mold 66. In order to insert covering 24 into mold 66, covering 24 is positioned adjacent to and abutting female component 70 of mold 66 such that second surface 54 of flange 50 abuts first surface 96 of flange portion 92. Male component 68 is brought into contact with central portion 26 of covering 24 such that second surface 72 of the male component 68 of mold 66 engages first surface 28 of central portion 26 and urges central portion 26 of covering 24 into depression 110 within female component 70 of mold 66. As central portion 26 of covering 24 is urged into depression 110, flange 50 of covering 24 is folded perpendicularly such that flange 50 and first surface 28 of central portion 26 of covering 24 define cavity 132, as illustrated in FIG. 4b. Cavity 132 is shaped and sized so that male component 68 of mold 66 may be received therein. Central portion 26 of covering 24 is therefore able to selectively mate with depression 110 of female component 70, while male component 68 is able to selectively mate with cavity 132 formed by female component 70 and covering 24 selectively mating. Flange 50 is movable between a first position where flange 50 lies in a first plane generally parallel to first surface 28 of central portion 26 and a second position where flange 50 is generally perpendicular to the first plane thereby defining cavity 132.

Figure 5:
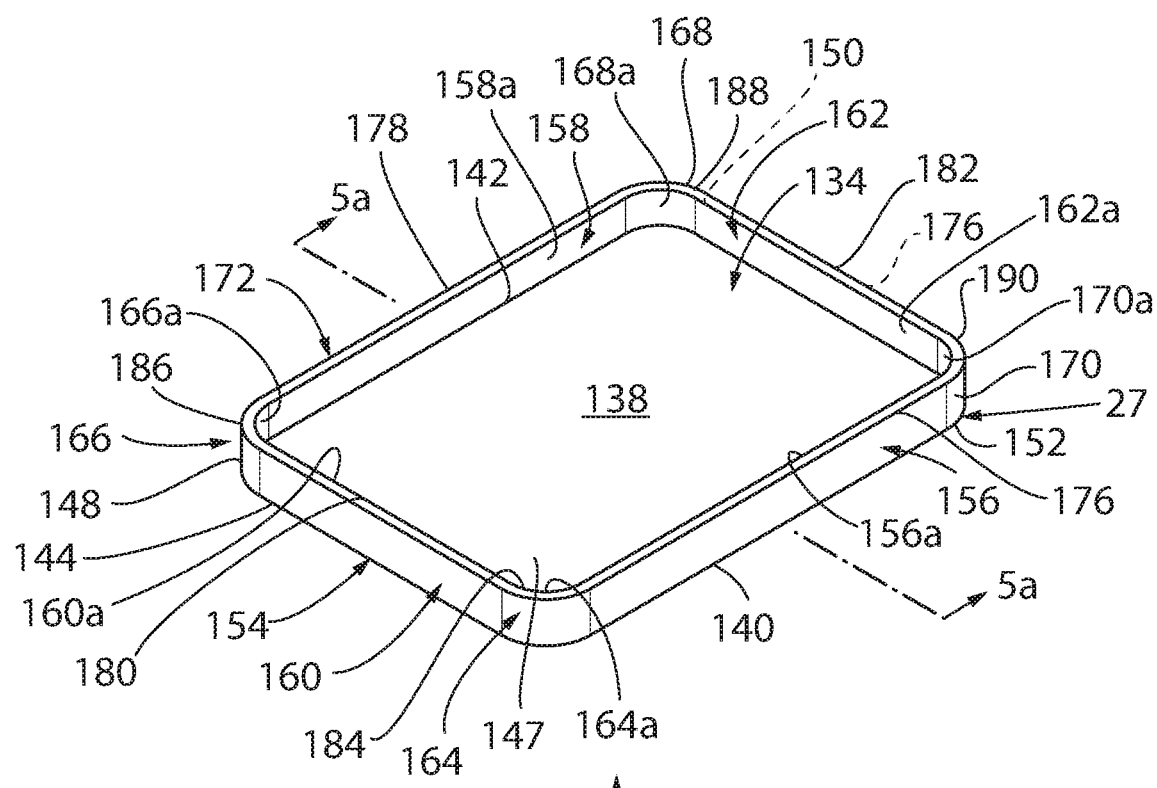
FIG. 5 is an exploded, isometric view showing an initial step in the mounting of the covering fabricated in accordance with the methodology of the present invention to a hatch door/lid.
Figure 5:
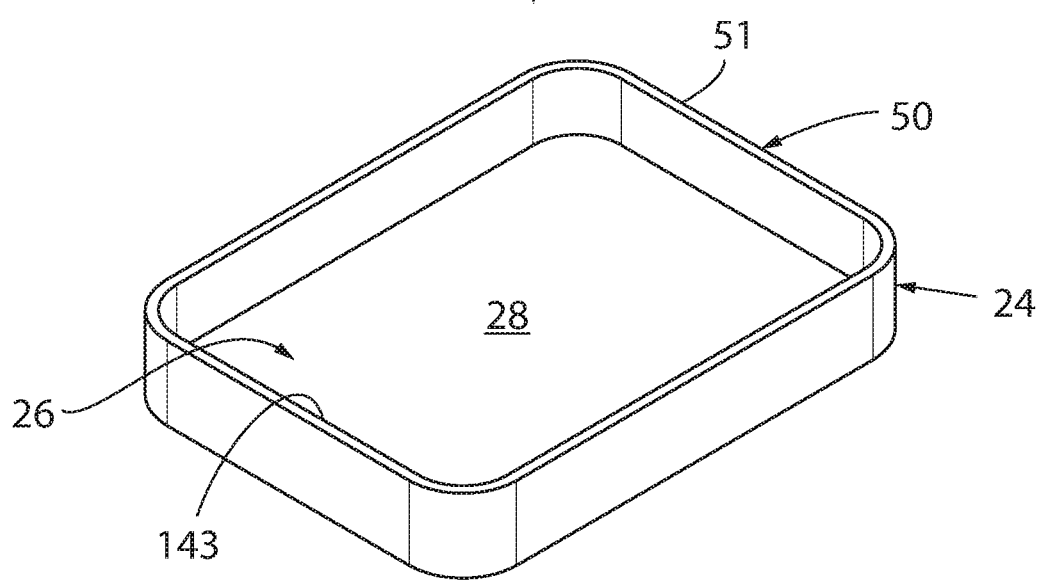
Figure 5A:
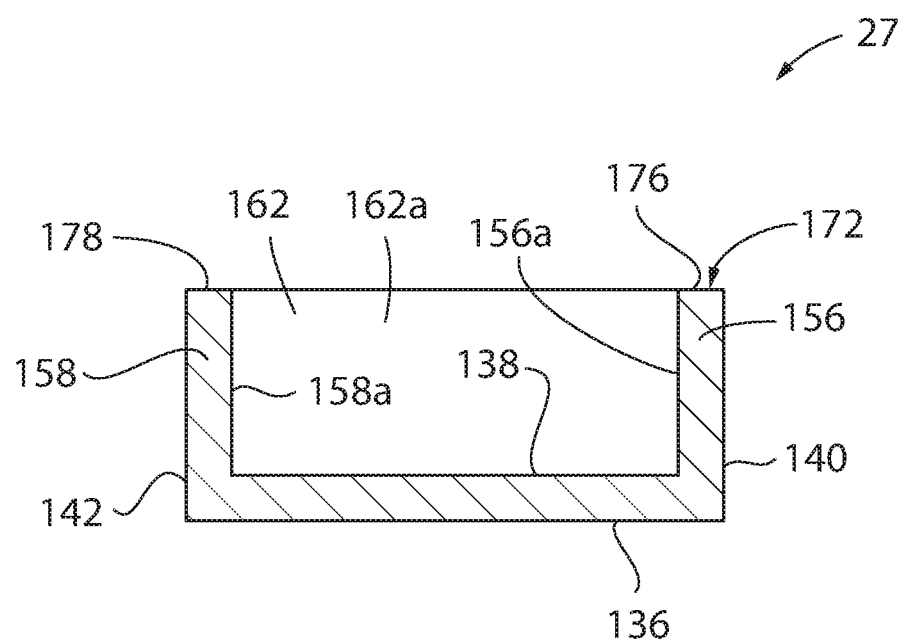
FIG. 5a is a cross-sectional view of the mounting of the covering to the hatch door/lid taken along line 5a-5a of FIG. 5.

Once formed, covering 24 is allowed to cool and solidify. Thereafter, male component 68 of mold 66 is removed from cavity 132 of covering 24 and covering 24 is ejected from depression 110 within female component 70 of mold 66. Once ejected from mold 66, covering 24 may be interconnected or mated to hatch 27, as hereinafter described. As previously noted, hatch 27 may have a variety of configurations. Turning to FIGS. 5 and 5a, by way of example, hatch 27 includes plate 134 which includes inner plate surface 136 and outer plate surface 138. Plate 134 further includes first plate side 140 and second plate side 142. First and second plate sides 140 and 142, respectively, are generally parallel to each other. Plate 134 further includes first plate end 144 and second plate end 146, generally parallel to each other. First plate side 140 is interconnected to first plate end 144 by first rounded corner 147, while first plate end 144 is interconnected to second plate side 142 by second rounded corner 148. Second plate side 142 is further interconnected to second plate end 146 by third rounded corner 150. Finally, second plate end 146 is interconnected to first plate side 140 by fourth rounded corner 152. First plate side 140, second plate side 142, first plate end 144, second plate end 146, and rounded corners 147, 148, 150 and 152 define outer plate periphery 154 of plate 134. Outer plate periphery 154 corresponds in dimensions to cavity 132 defined by edge 51 of flange 50 of covering 24, for reasons hereinafter described.

Hatch 27 further includes first and second hatch sidewalls 156 and 158, respectively. First hatch sidewall 156 extends from first plate sidewall 140, while second hatch sidewall 158 extends from second plate sidewall 142. Likewise, first hatch end 160 extends from first plate end 144 and second hatch end 162 extends from second plate end 146.

First hatch sidewall 156 is interconnected to first hatch end 160 by first arcuate corner wall 164, while first hatch end 160 is interconnected to second hatch sidewall 158 by second arcuate corner wall 166. Second hatch sidewall 158 is further interconnected to second hatch end 162 by third arcuate corner wall 168 and second hatch end 162 is interconnected to first plate side 140 by fourth arcuate corner wall 170. First hatch sidewall 156, second hatch sidewall 158, first hatch end 160, second hatch end 162, and arcuate corner walls 164-170 define hatch rim 172 that extends around the perimeter of plate 134 of hatch 27.

Inner surfaces 156a, 158a, 160a, 162a, 164a, 166a, 168a, and 170a, of the first hatch sidewall 156, second hatch sidewall 158, first hatch end 160, second hatch end 162, and arcuate corner walls 164-170, respectively, define hatch cavity 174 located and positioned within hatch 27. Hatch cavity 174 is further defined by hatch rim 172 which extends around perimeter of hatch cavity 174. Hatch rim 172 includes terminal edges 176, 178, 180, 182, which correspond to first hatch sidewall 156, second hatch sidewall 158, first hatch end 160, and second hatch end 162, respectively. Hatch rim 172 further includes terminal corner edges 184, 186, 188, 190, which correspond to arcuate corner to walls 164, 166, 168, and 170, respectively.

Figure 6:
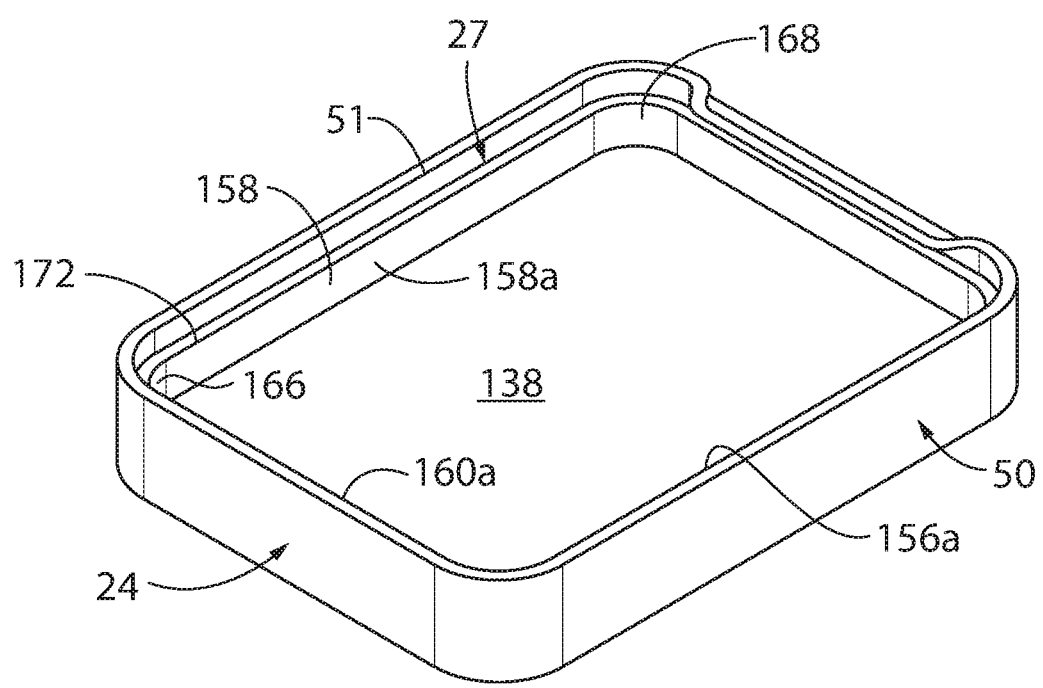
FIG. 6 is an isometric view showing a subsequent step in the mounting of the marine floor covering fabricated in accordance with the methodology of the present invention to the hatch door/lid.

Referring to FIG. 6, to secure covering 24 on hatch 27, hatch 27 is positioned within cavity 132 of covering 24 such that outer surface 136 of plate 134 engages first surface 28 of central portion 26 of covering 24 and such that flange 50 surrounds the first hatch sidewall 156, second hatch sidewall 158, first hatch end 160, second hatch end 162, and arcuate corner walls 164-170. When the hatch 27 is positioned within the cavity 132, outer edge 51 of flange 50 projects beyond hatch rim 172 of the hatch 27. As such, it is intended for the outer edge 51 of the flange 50 to be rolled over hatch rim 172 of hatch 27 and bonded to inner surface 156a of first hatch sidewall 156, inner surface 158a of second hatch sidewall 158, inner surface 160a of first hatch end 160, and inner surface 162a of second hatch end 162. Outer edge 51 of flange 50 can be further rolled over the hatch rim 172 and bonded to inner surfaces 164a, 166a, 168a, and 170a of arcuate corner walls 164-170. It can be appreciated that a portion of flange 50 adjacent to outer edge 51 thereof may be heated to facilitate the rolling of outer edge 51 over hatch rim 172 of hatch 27.

It can be appreciated that the above description is merely exemplary of the present invention. Various modes of carrying out the invention are contemplated as being within the scope of the following claims particularly pointing out and distinctly claiming the subject matter which is regarded as the invention.

We claim:

1. A method of forming a covering for a lid, comprising:
providing a mold having a male component and a female component, the female component including a depression and a flange portion extending around a perimeter of the depression;
inserting at least a portion of the covering into the depression of the female component so as to form a cavity in the at least a portion of the covering inserted into the depression;
inserting the male component into the cavity;
removing the male component of the mold cavity when the covering has cooled; and
removing the covering from the female component of the mold, the covering including a flange projecting therefrom;
wherein the flange is configured to is move relative to the cavity in the covering such that at least a portion of the flange is extendable over a sidewall of the lid with the lid positioned within the cavity of the covering.

2. The method of claim 1 wherein the covering removed from the female component of the mold includes a central portion having a configuration corresponding to a configuration of the lid and the flange projects from the central portion.

3. A method of forming a covering for a lid, comprising:
providing a mold having a male component and a female component, the female component including a depression and a flange portion extending around a perimeter of the depression;
inserting at least a portion of the covering into the depression of the female component so as to form a cavity in the at least a portion of the covering inserted into the depression;
inserting the male component into the cavity;
removing the male component of the mold cavity when the covering has cooled;
removing the covering from the female component of the mold, the covering removed from the female component of the mold includes a central portion having a configuration corresponding to a configuration of the lid and a flange projecting from the central portion;
positioning the lid within the cavity of the covering; and
extending at least a portion of the flange over a sidewall of the lid.

4. The method of claim 3 comprising the additional step of securing at least a portion of the flange to at least one arcuate corner wall of the lid.

5. The method of claim 3 comprising the additional step of securing at least a portion of the flange to the sidewall of the lid.

6. A method of forming a covering for a lid, comprising:
providing a mold having a male component and a female component, the female component including a depression and a flange portion extending around a perimeter of the depression;
inserting at least a portion of the covering into the depression of the female component so as to form a cavity in the at least a portion of the covering inserted into the depression;
inserting the male component into the cavity;
removing the male component of the mold cavity when the covering has cooled; and
removing the covering from the female component of the mold, the covering removed from the female component of the mold includes a central portion having a configuration corresponding to a configuration of the lid and a flange projecting from the central portion;
wherein step of inserting at least the portion of the covering into the depression of the female component includes the steps of heating the flange and moving the flange relative to the central portion.

7. The method of claim 1 wherein the covering is formed from a polymer foam.

8. The method of claim 1 further comprising the additional step of machining a sheet to form the covering prior to inserting at least a portion of the covering into the depression of the female component.

9. The method of claim 1 further comprising the additional step of heating at least a portion of the mold prior to inserting the portion of the covering into the depression of the female component.

10. The method of claim 1 further comprising the additional step of heating the covering to inserting the portion of the covering into the depression of the female component.

11. A method of covering a hatch door, the hatch door having a plate and a sidewall extending therefrom, comprising the steps of:
modifying a sheet of foam material to form a covering, the covering including a central portion and a flange projecting from an outer periphery of the central portion;
moving the flange relative to the central portion of the covering so as to provide a cavity in the covering;
positioning the hatch door in the cavity of the floor covering; and
wrapping at least a portion of the flange over the sidewall of the hatch door.

12. The method of claim 11 comprising the additional step of heating the flange prior to moving the flange relative to the central portion.

13. The method of claim 11 comprising the additional step of affixing the flange to the sidewall of the hatch door.

14. The method of claim 11 further comprising the additional step of affixing the flange to at least one arcuate corner wall of the hatch door.

15. The method of claim 11 wherein the step of modifying the sheet includes the step of machining the sheet.

16. The method of claim 11 wherein the foam is a polymer foam.

17. The method of claim 11 wherein the step of moving the flange relative to central portion of the covering includes the additional steps of:

positioning the flange of the covering on a flange portion of a female mold component, the flange portion extending about a depression in the female mold component; and bringing a male mold component into contact with the central portion of the covering so as to urge the central portion of the floor covering into the depression.

18. A covering for a hatch door, comprising:

a central portion having a configuration corresponding to a configuration of the hatch door and a thickness; and a flange projecting from the central portion and having a thickness less than the thickness of the central portion, the flange movable between a first position wherein the flange lies in a first plane generally parallel to a first surface of the central portion and a second position wherein the flange is generally perpendicular to the first plane and defines a cavity in the covering for receiving the hatch door therein.

19. The covering of claim 18 wherein:

the flange has an outer periphery; and a lip projects from at least a portion of the flange adjacent the outer periphery, wherein the lip stabilizes the flange when heated.

20. The covering of claim 19 wherein the lip extends around the entirety of a perimeter of the flange adjacent the outer periphery.

21. The covering of claim 18 wherein the flange includes an outer flange periphery, the outer flange periphery of the flange being rollable over a sidewall of the hatch door when the hatch door received is in the cavity.

22. The covering of claim 21 wherein the outer flange periphery is secured to the sidewall of the hatch door.

23. The covering of claim 21 wherein the outer flange periphery is further secured to at least one arcuate corner wall of the hatch door.

\* \* \* \* \*